(12) United States Patent
Aslot et al.

(10) Patent No.: US 9,342,342 B2
(45) Date of Patent: May 17, 2016

(54) REFRESHING MEMORY TOPOLOGY IN VIRTUAL MACHINE OPERATING SYSTEMS

(71) Applicant: International Business Machines Corporation, Armonk, NY (US)

(72) Inventors: Vishal C. Aslot, Austin, TX (US); Arnold Flores, Round Rock, TX (US); Mark D. Rogers, Round Rock, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 300 days.

(21) Appl. No.: 13/833,748

(22) Filed: Mar. 15, 2013

(65) Prior Publication Data

US 2014/0282515 A1 Sep. 18, 2014

(51) Int. Cl.
*G06F 9/46* (2006.01)
*G06F 9/455* (2006.01)
*G06F 12/02* (2006.01)

(52) U.S. Cl.
CPC .......... *G06F 9/45558* (2013.01); *G06F 12/023* (2013.01); *G06F 2009/45583* (2013.01); *G06F 2212/152* (2013.01)

(58) Field of Classification Search
CPC .................................................. G06F 9/45558
USPC ............................................................ 718/1
See application file for complete search history.

(56) References Cited

U.S. PATENT DOCUMENTS

| | | | |
|---|---|---|---|
| 7,318,140 B2 | 1/2008 | Flemming et al. | |
| 8,108,866 B2 | 1/2012 | Anand et al. | |
| 2006/0136653 A1* | 6/2006 | Traut et al. | 711/6 |
| 2006/0253682 A1* | 11/2006 | Armstrong et al. | 711/173 |
| 2007/0168635 A1* | 7/2007 | Allen et al. | 711/173 |
| 2009/0307439 A1* | 12/2009 | Jacobs et al. | 711/153 |
| 2010/0037222 A1* | 2/2010 | Tatsubori et al. | 718/100 |
| 2012/0102258 A1 | 4/2012 | Hepkin et al. | |
| 2013/0108263 A1* | 5/2013 | Srinivas et al. | 398/45 |

OTHER PUBLICATIONS

Bain, K. et al.; Introducing Microsoft Virtual Server 2005 on IBM eserver xSeries Servers; IBM Corporation; Redpaper; www.ibm.com/redp3912; Nov. 2004.

IBM; System and method to optimize cache and memory affinity in a virtualized environment; http://www.ip.com/pubview/IPCOM000133807D; Feb. 9, 2006.

(Continued)

*Primary Examiner* — Timothy A Mudrick
(74) *Attorney, Agent, or Firm* — James L. Baudino (57) ABSTRACT

According to one aspect of the present disclosure a system and technique for refreshing memory topology in virtual machine operating systems is disclosed. The system includes a processor and logic executable by the processor to: responsive to receiving, by an operating system of a virtual machine, a notification of an affinity change relative to workload memory resources, poll a hypervisor for updated memory affinity data; determine, for each logical memory block of the workload memory resources, whether an affinity string for the respective logical memory block has changed; responsive to determining that the affinity string for the respective logical memory block has changed, identify a data structure of the logical memory block maintained by the operating system; and update affinity information in the data structure based on the change to the affinity string of the logical memory block.

12 Claims, 5 Drawing Sheets

(56) References Cited

OTHER PUBLICATIONS

Vmware, Inc.; Associate Memory Allocations with a NUMA Node Using Memory Affinity; vSphere Resource Management Guide; Internet publication (http://pubs.vmware.com/vsphere-4-esx-vcenter/index.jsp?topic=/com.vmware.vsphere.resourcemanagement.doc_41/using_numa_systems_with_esx_esxi/t_associate_memory_allocations_with_a_numa_node_using_memory_affinity.html); 2011.

Vmware, Inc.; Best Practices for Performance Tuning of Latency-Sensitive Workloads in vSphere VMs; Technical White Paper; 2011.

* cited by examiner

REFRESHING MEMORY TOPOLOGY IN VIRTUAL MACHINE OPERATING SYSTEMS

BACKGROUND

System virtualization is a technology which can divide a single host (e.g., computer, server, etc.), into multiple parts, or partitions, each running a separate instance, or image, of an operating system. The instances of the operating systems or partitions are separate, or isolated, from each other in some ways. For example, the partitions have separate file systems, separate users, separate applications, and separate processes. However, the partitions may also share some resources of the host. For example, the partitions can share the memory, the kernel, the processors, the hard drives, and/or other software, firmware, and/or hardware of the host. Thus, each partition or instance of the operating system can look and feel like a separate server or machine from the perspective of its users. These instances are commonly referred to as "virtual" or "virtualized" machine, and each partition may be referred to as a logical partition (LPAR).

One server or data processing system can generally host a number of LPARs. These LPARs generally have virtual resources assigned to them (e.g., virtual processors) which provide an abstraction of the physical resource from which it is based (e.g., the physical processor). For example, a virtual resource may be considered a logical entity that is backed up by the physical entity. In a dedicated mode of LPAR operation, physical resources are assigned as a whole to an LPAR such that the assigned physical resources are not shared by other LPARs. In a shared mode of LPAR operation, the physical resources are part of a pool of resources which are shared among the LPARs. Additionally, LPARs can be configured to have a certain entitlement capacity representing a guaranteed physical resource capacity for the LPAR. LPARs may also be configured as capped or uncapped. In a capped mode, the resource capacity for the LPAR is capped at some value (e.g., its entitlement capacity). In an uncapped mode, the LPAR can exceed its entitlement capacity when other shared resources are available.

BRIEF SUMMARY

According to one aspect of the present disclosure a system and technique for refreshing memory topology in virtual machine operating systems is disclosed. The system includes a processor and logic executable by the processor to: responsive to receiving, by an operating system of a virtual machine, a notification of an affinity change relative to workload memory resources, poll a hypervisor for updated memory affinity data; determine, for each logical memory block of the workload memory resources, whether an affinity string for the respective logical memory block has changed; responsive to determining that the affinity string for the respective logical memory block has changed, identify a data structure of the logical memory block maintained by the operating system; and update affinity information in the data structure based on the change to the affinity string of the logical memory block.

BRIEF DESCRIPTION OF THE SEVERAL VIEWS OF THE DRAWINGS

For a more complete understanding of the present application, the objects and advantages thereof, reference is now made to the following descriptions taken in conjunction with the accompanying drawings, in which.

DETAILED DESCRIPTION

Embodiments of the present disclosure provide a method, system and computer program product for refreshing memory topology in virtual machine operating systems. For example, in some embodiments, the method and technique includes: responsive to receiving, by an operating system of a virtual machine, a notification of an affinity change relative to workload memory resources, polling a hypervisor for updated memory affinity data; determining, for each logical memory block of the workload memory resources, whether an affinity string for the respective logical memory block has changed; responsive to determining that the affinity string for the respective logical memory block has changed, identifying a data structure of the logical memory block maintained by the operating system; and updating affinity information in the data structure based on the change to the affinity string of the logical memory block. Embodiments of the present disclosure enable memory topology and affinity to be refreshed in virtual machine operating systems without requiring a reboot of the operating system. Further, embodiments of the present disclosure enable dynamic memory affinity updates to take place in the operating system based on affinity changes made to the physical resources of a computing system platform.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer usable or computer readable medium(s) may be utilized. The computer readable medium may be a computer readable signal medium or a computer readable storage medium. A computer readable storage medium may be, for example but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 1:
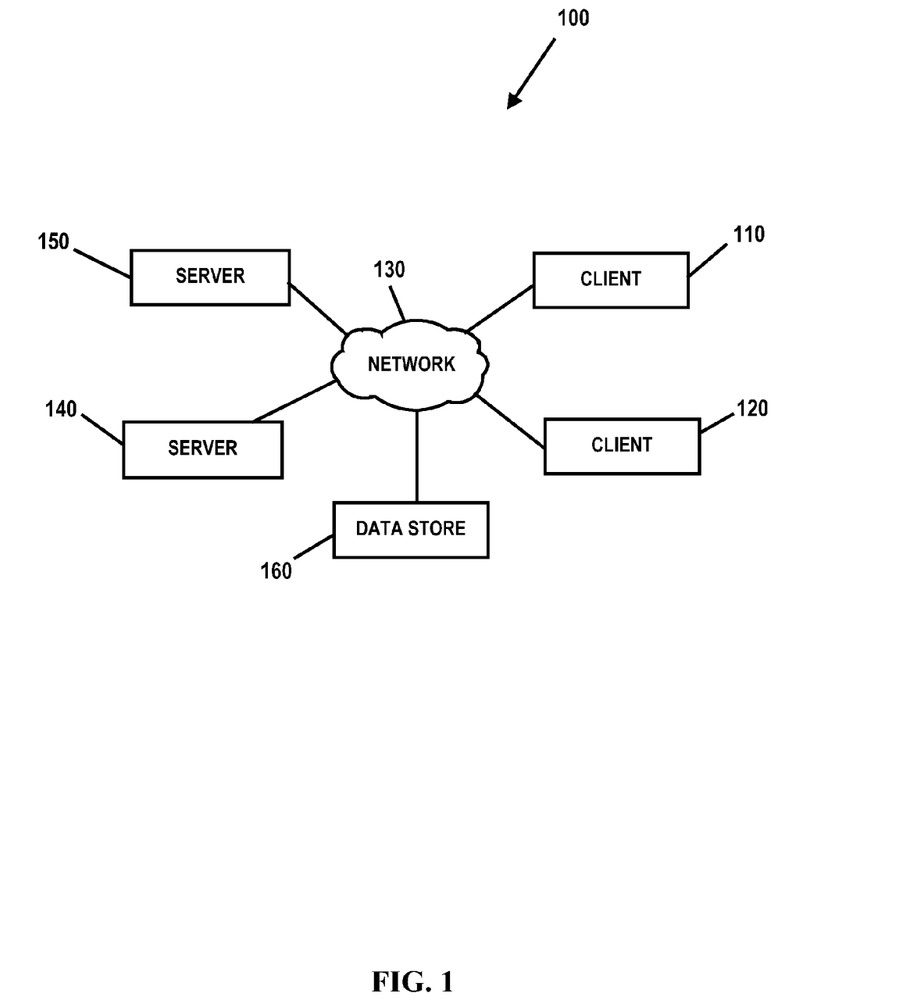
FIG. 1 is an embodiment of a network of data processing systems in which the illustrative embodiments of the present disclosure may be implemented.
Figure 2:
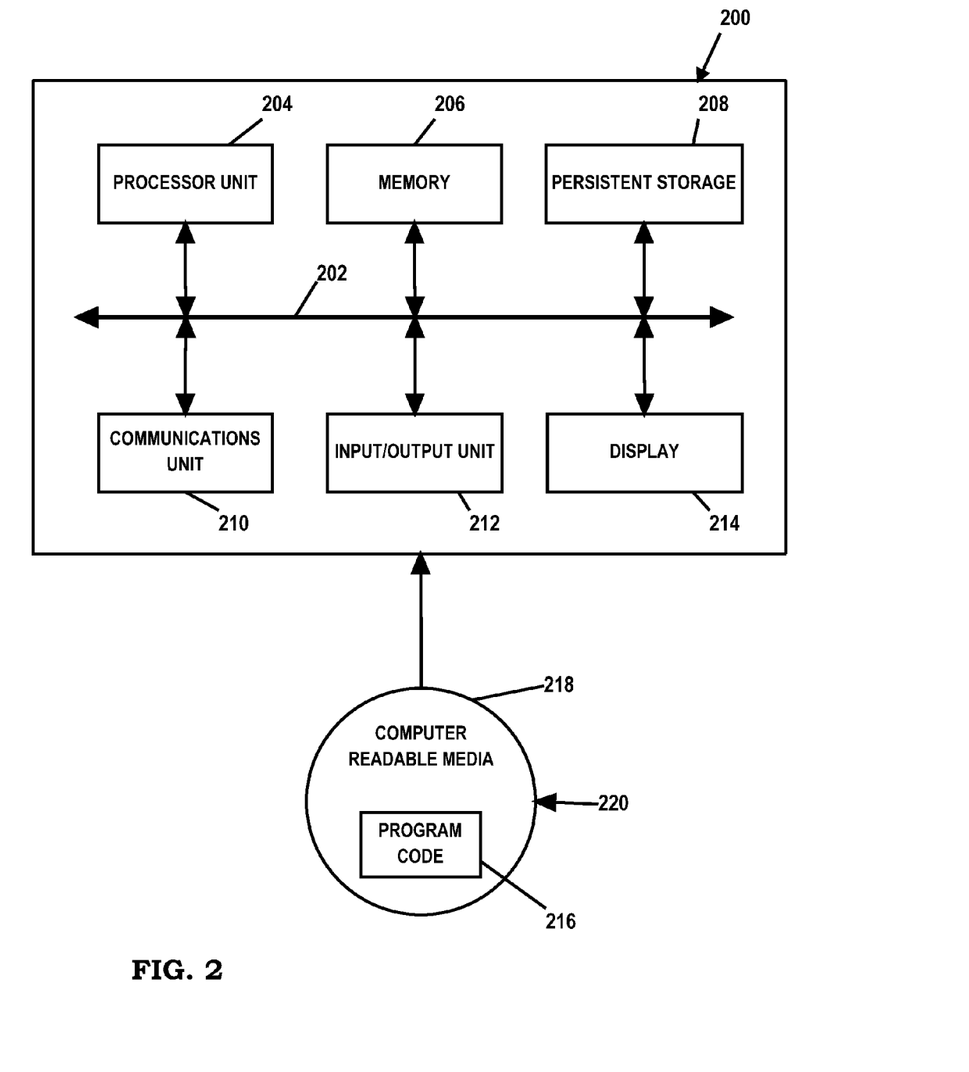
FIG. 2 is an embodiment of a data processing system in which the illustrative embodiments of the present disclosure may be implemented.

With reference now to the Figures and in particular with reference to FIGS. 1-2, exemplary diagrams of data processing environments are provided in which illustrative embodiments of the present disclosure may be implemented. It should be appreciated that FIGS. 1-2 are only exemplary and are not intended to assert or imply any limitation with regard to the environments in which different embodiments may be implemented. Many modifications to the depicted environments may be made.

FIG. 1 is a pictorial representation of a network of data processing systems in which illustrative embodiments of the present disclosure may be implemented. Network data processing system 100 is a network of computers in which the illustrative embodiments of the present disclosure may be implemented. Network data processing system 100 contains network 130, which is the medium used to provide communications links between various devices and computers connected together within network data processing system 100. Network 130 may include connections, such as wire, wireless communication links, or fiber optic cables.

In some embodiments, server 140 and server 150 connect to network 130 along with data store 160. Server 140 and server 150 may be, for example, IBM® Power Systems™ servers. In addition, clients 110 and 120 connect to network 130. Clients 110 and 120 may be, for example, personal computers or network computers. In the depicted example, server 140 provides data and/or services such as, but not limited to, data files, operating system images, and applications to clients 110 and 120. Network data processing system 100 may include additional servers, clients, and other devices.

In the depicted example, network data processing system 100 is the Internet with network 130 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

FIG. 2 is an embodiment of a data processing system 200 such as, but not limited to, client 110 and/or server 140 in which an embodiment of a system for refreshing memory topology in virtual machine operating systems according to the present disclosure may be implemented. In this embodiment, data processing system 200 includes a bus or communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multiprocessor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

In some embodiments, memory 206 may be a random access memory or any other suitable volatile or non-volatile storage device. Persistent storage 208 may take various forms depending on the particular implementation. For example, persistent storage 208 may contain one or more components or devices. Persistent storage 208 may be a hard drive, a flash memory, a rewritable optical disk, a rewritable magnetic tape, or some combination of the above. The media used by persistent storage 208 also may be removable such as, but not limited to, a removable hard drive.

Communications unit 210 provides for communications with other data processing systems or devices. In these examples, communications unit 210 is a network interface card. Modems, cable modem and Ethernet cards are just a few of the currently available types of network interface adapters. Communications unit 210 may provide communications through the use of either or both physical and wireless communications links.

Input/output unit 212 enables input and output of data with other devices that may be connected to data processing system 200. In some embodiments, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer readable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. For example, a storage device in data processing system 200 is any hardware apparatus that may store data. Memory 206, persistent storage 208, and computer readable media 218 are examples of storage devices in a tangible form.

Figure 3:
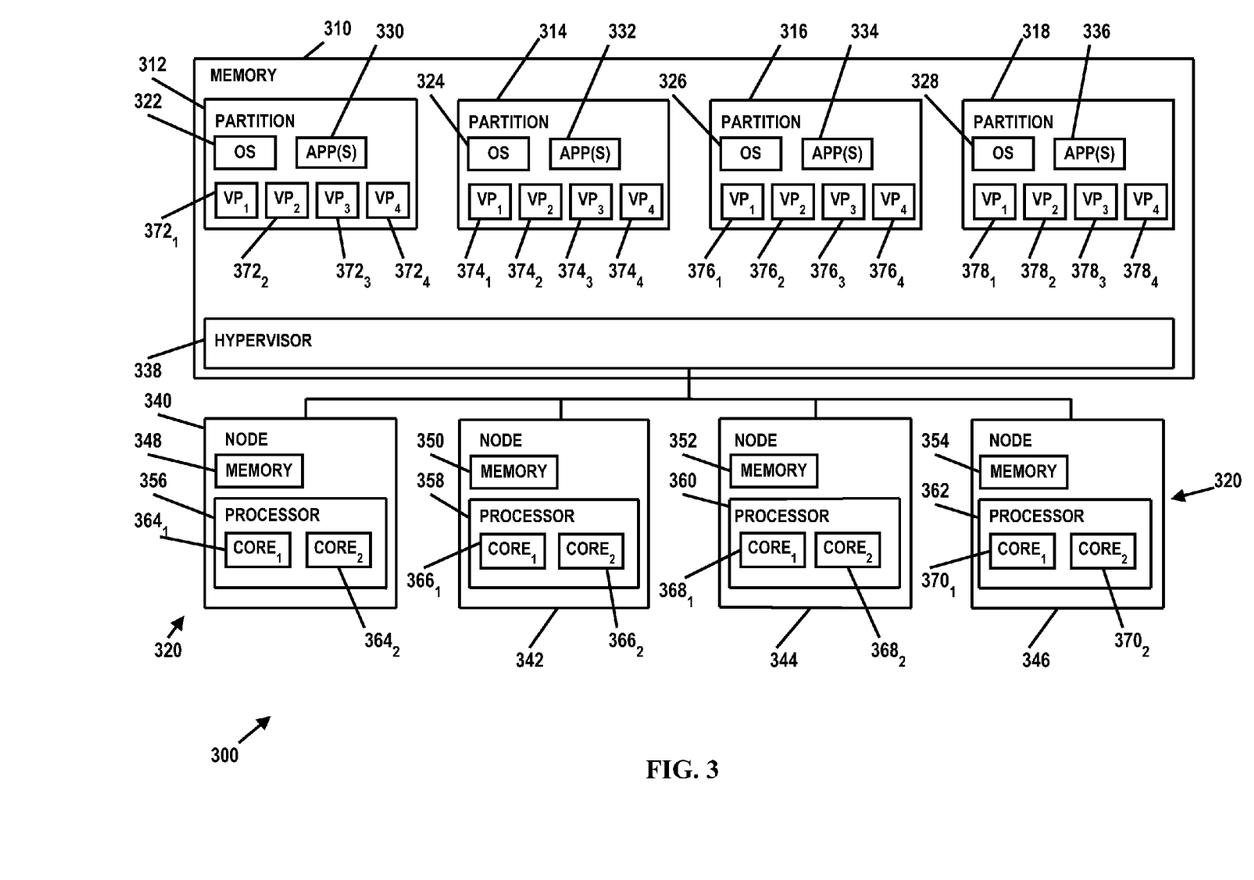
FIG. 3 is a diagram illustrating an embodiment of a data processing system for refreshing memory topology in virtual machine operating systems in which illustrative embodiments of the present disclosure may be implemented.

FIG. 3 is an illustrative embodiment of a system 300 for refreshing memory topology in virtual machine operating systems. System 300 may be implemented on data processing systems or platforms such as, but not limited to, servers 140 and/or 150, clients 110 and/or 120, or at other data processing system locations. In the embodiment illustrated in FIG. 3, system 300 is apportioned into logical partitions (LPARs) or virtual machines that may operate independently, each LPAR running its own operating system and applications. In the illustrated embodiment, system 300 includes a memory 310 having LPARs 312, 314, 316 and 318; however, it should be understood that a greater or fewer quantity of LPARs may be provisioned. LPARs are assigned a subset of a computer's physical hardware resources 320 (i.e., a subset of the hardware underlying the computer/server environment) and are virtualized within the computer/server environment as a separate computer/virtual machine. Resources such as processor capacity, memory, or any other type of resource may be assigned to a particular LPAR. Each LPAR has its own virtual operating system (OS) instance (e.g., operating systems 322, 324, 326 and 328 in respective LPARs 312, 314, 316 and 318), application programs (e.g., application(s) 330, 332, 334 and 336 in respective LPARs 312, 314, 316 and 318) and/or associated files, allowing for multiple operating systems to be simultaneously executing within the server computer/environment.

Logical partitioning is facilitated by logic or software 338 (a "hypervisor") that controls the computer system's hardware and monitors the operating systems of the LPARs. For example, hypervisor 338 may comprise software, logic and/or executable code for performing various functions as described herein (e.g., residing as software and/or an algorithm running on a processor unit). Hypervisor 338 operates at a level between the logical partition operating systems level and computer/server system physical hardware resources 320. Hypervisor 338 may run directly on the computer system's hardware or within a conventional operating system environment, depending upon the implementation.

In the illustrated embodiment, physical resources 320 include a number of integrated circuits (ICs), chips or processing nodes 340, 342, 344 and 346. The quantity and/or types of physical resources may vary. In the illustrated embodiment, each respective node 340, 342, 344 and 346 includes a memory 348, 350, 352 and 354 and a processor 356, 358, 360 and 362. Each processor 356, 358, 360 and 362 may comprise one or more processor cores. For example, processor 356 includes cores $364_1$-$364_2$, processor 358 includes cores $366_1$-$366_2$, processor 360 includes cores $368_1$-$368_2$, and processor 362 includes cores $370_1$-$370_2$. It should be understood that the quantity of cores for any particular node may vary. Nodes 340, 342, 344 and 346 (or components thereof) may comprise a shared physical resource pool (e.g., as to processors 356, 358, 360 and 362, a shared processor pool). The shared pool of physical resources enables a system or apparatus to assign whole and/or partial resources to a logical partition. For example, physical processors 356, 358, 360 and 362 may be configured as a processing pool such that processors 356, 358, 360 and 362 (as well as their respective cores) are shared among numerous logical partitions (e.g., LPARs 312, 314, 316 and 318).

Logical partitions may be assigned virtual resources which may comprise logical entities backed up by corresponding physical entities. For example, logical partitions may be assigned virtual processors which are depictions of physical processors (e.g., processors 356, 358, 360 and 362) that are presented to the operating system of the respective partition. The types of physical resources that may be virtualized may vary. With respect to virtual processors, each virtual processor may represent a processing capacity (e.g., a processing unit) of a physical processor. The processing capacity represented by a virtual processor may be the entire processing capacity of a physical processor or a portion thereof. In the illustrated embodiment, each LPAR 312, 314, 316 and 318 has assigned thereto a number of virtual processors. For example, LPAR 312 includes virtual processors ($VP_1$-$VP_4$) $372_1$-$372_4$. Similarly, LPAR 314 includes virtual processors ($VP_1$-$VP_4$) $374_1$-$374_4$, LPAR 316 includes virtual processors ($VP_1$-$VP_4$) $376_1$-$376_4$, and LPAR 318 includes virtual processors ($VP_1$-$VP_4$) $378_1$-$378_4$. The number of virtual processors assigned to a particular partition and/or an overall computing platform may vary.

In some embodiments, LPARs can be configured to have a certain entitlement capacity or entitled resources representing a guaranteed physical resource capacity for the LPAR. For example, LPAR 312 includes four virtual processors and may have a core entitlement of two such that a two-core processing capacity is guaranteed for LPAR 312. Because the cores may be allocated from a shared processor pool, hypervisor 338 allocates core processing capacity from the shared processor pool as needed, which means the cores provided to LPAR 312 to meet its entitlement may also be used by other LPARs. In an uncapped mode of operation, if LPAR 312 requires additional processing capacity beyond its entitlement, hypervisor 338 may allocate additional cores from the shared processor pool (if available).

Generally, there are multiple storage levels a core may access such as processor caches (L1, L2, L3, etc.), memory (RAM), and disk storage. Further, within each storage level there, may be multiple levels of affinity (e.g., determined by the distance between a core and the memory it accesses). The first level of affinity may comprise a memory located on the same chip as the core. A next level of affinity may refer to memory located on a neighbor chip, etc. A further level of affinity may comprise memory located on a different computing system. Because the cores in a shared processor pool may be shared by any LPAR, the core allocated to a LPAR may not be located in its first affinity level. For example, hypervisor 338 may allocate and/or assign memory 348 to LPAR 312. If hypervisor thereafter allocates core $364_1$ or $364_2$ to any of virtual processors $372_1$-$372_4$, a first level affinity is maintained to memory 348. However, if hypervisor 338 assigns a core from one of nodes 342, 344 or 346, second, third or lower affinity levels result from a respective core on nodes 342, 344 or 346 accessing memory 348 on node 340, thereby impacting performance of the workloads running on the LPARs. Numerous types of activities may result in changes in affinity, such as partition mobility operations, disruptive dynamic virtualization actions, dynamic platform optimization processes, suspend/resume operations, etc. These changes in underlying affinity may results in the OS making suboptimal memory placement and thread scheduling decisions. Embodiments of the present disclosure reconstruct a VM's memory affinity mappings in the OS to improve affinity levels to physical resources utilized by LPARs to thereby increase performance.

Figure 4:
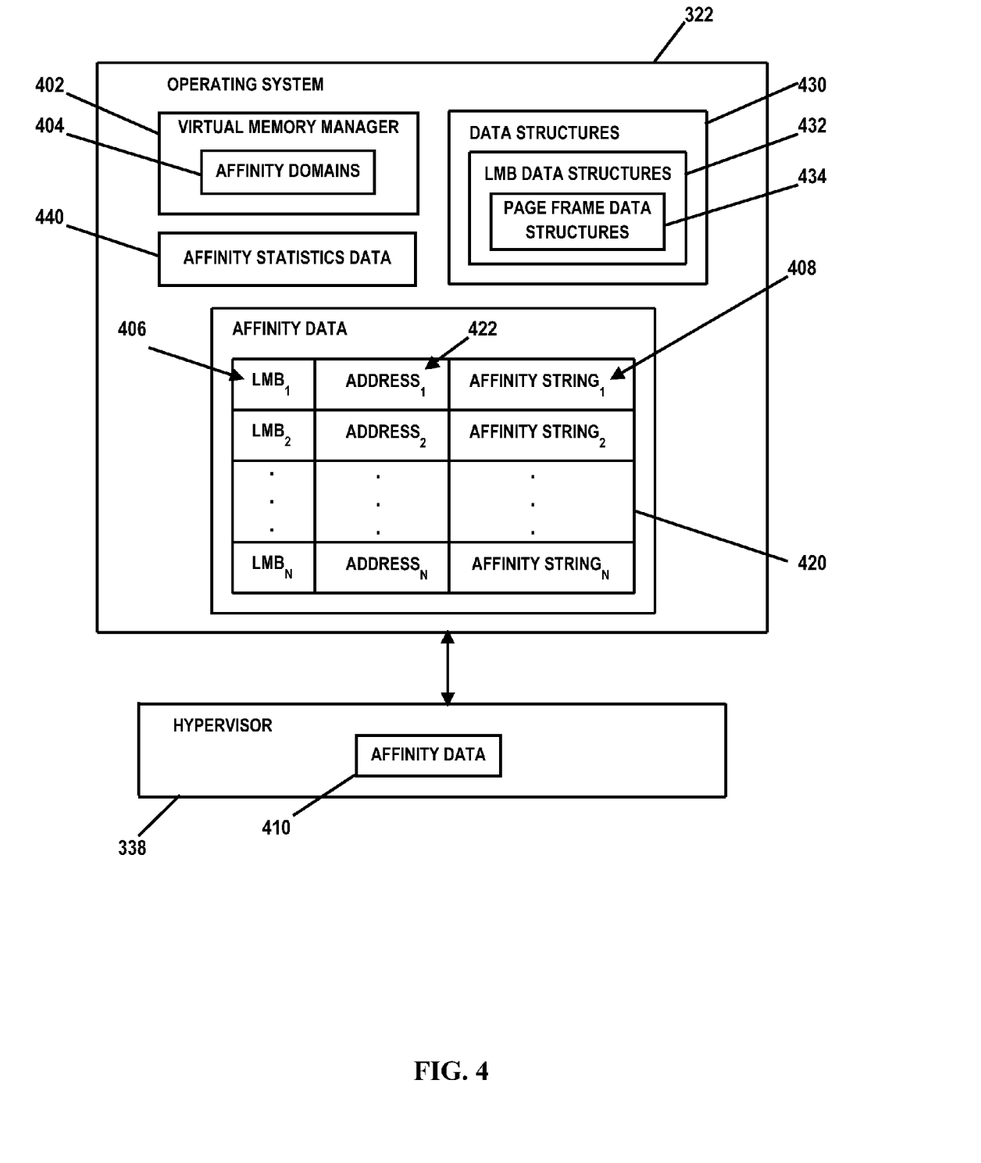
FIG. 4 is a diagram illustrating an embodiment of an operating system in a data processing system for refreshing memory topology in virtual machine environments according to the present disclosure.

FIG. 4 is a diagram illustrating an embodiment of operating system and hypervisor interaction according to the present disclosure. In the embodiment illustrated in FIG. 4, a single operating system instance is shown (e.g., OS 322); however, it should be understood that other operating systems of system 300 may be similarly configured. In operation, operating system 322 uses data structures called memory pools to manage the free memory in each memory resource. The memory resource pool data structures used to manage the free memory in one memory resource may be grouped together to form an affinity domain (e.g., having a particular affinity level). In the embodiment illustrated in FIG. 4, operating system 322 includes a virtual memory manager (VMM) 402. VMM 402 may comprise software, logic and/or executable code for performing various functions as described herein (e.g., residing as software and/or an algorithm running on a processor unit). VMM 402 maintains memory topology information in affinity domains 404. Each affinity domain 404 corresponds to one affinity domain in the hardware 320/hypervisor 338. An affinity domain 404 may comprise a collection of logical memory blocks (LMBs) 406. In some embodiments, each LMB 406 may comprise a fixed size logical memory block. For each affinity domain 404, there is generally a unique affinity string 408 (e.g., a character string with different characters/values identifying particular hardware resources and/or other information). In other words, the affinity string 408 identifies which affinity domain 404 the LMBs 406 correspond to.

In operation, the affinity of particular memory resources with respect to a given LPAR may change (e.g., as a result of partition mobility, optimization processes, etc.). Hypervisor 338 maintains affinity data 410 for the various memory resources of each LPAR in the system 300. Thus, as affinity changes within system 300 for various memory resources for various LPARs, hypervisor 338 updates affinity data 410 to reflect such changes. In some embodiments, hypervisor 338 is configured to notify the OS of each LPAR in response to a change in affinity data 410 (e.g., resulting from an affinity change in memory resources). The OS (e.g., OS 322), in response to such notification, may request affinity data 410 from hypervisor 338. It should be understood that in some embodiments, hypervisor 338 may be configured to automatically provide affinity data 410 to OS 322, OS 322 may periodically poll hypervisor 338 to acquire affinity data 410 and/or determine if changes to affinity have taken place, etc. Affinity data 410 may comprise information associated with LMBs 406 affinity to enable OS 322 to determine whether affinity changes have occurred for certain LMBs 406.

In some embodiments, OS 322 may receive affinity data 410 and temporarily store such affinity data 410 in an affinity data table 420; however, it should be understood that other formats and/or data manipulations may be performed. In some embodiments, affinity data 410 is evaluated and/or otherwise formatted by VMM 402 to provide a series of entries for each LMB 406. For example, each LMB 406 entry may comprise an address 422 of the corresponding LMB 406 and affinity string 408 for such LMB 406. VMM 402 may parse affinity data 410 received from hypervisor 338 to derive such information and/or otherwise determine affinity string 408 information for each LMB 406. In operation, VMM 402 may evaluate each LMB 406 to determine whether the affinity string 408 for the respective LMB 406 has changed, thereby indicating an affinity change for the LMB 406. VMM 402 may compare current affinity string 408 information to previously acquired/stored information. In some embodiments, VMM 402 may evaluate each LMB 406 and, in response to identifying a change in affinity string 408 for the respective LMB 406, begin performing global data structure 430 changes/updates based on the changed/updated affinity. For example, global data structures 430 may comprise process tables, open files table, tables related to memory management, etc., maintained by the OS. In the illustrated embodiment, structures 430 include LMB data structures 432 and individual page frame data structures 434. However, it should be understood that the data structures 430 may also include global data structures per affinity domain, free lists per affinity domain, memory intervals data structures to track various ranges of memory per affinity domain, various statistics maintained by the OS for the affinity domains and page frames, and statistics related to affinity domains maintained by each CPU for each memory reference. Each LMB 406 may comprise different types of memory (e.g., kernel special memory, pageable memory, non-pageable memory, memory mapped for direct memory access (DMA), etc.). In some embodiments, VMM 402 evaluates each page of memory of the LMB 406 at a time and updates the data structures maintained by the OS for the evaluated memory page (e.g., individual page frame data structures 434 and/or other data structures) with the changed/revised affinity data. In some embodiments, VMM 402 determines whether the particular affinity domain 404 based on the affinity string 408 exists for the corresponding data structure. If not, VMM 402 allocates/creates the particular affinity domain and updates the corresponding data structure accordingly.

In some embodiments, if a particular affinity domain 404 is empty and/or no longer referenced, VMM 402 is operable to offline and/or delete the empty affinity domain 404. VMM 402 processes the various pages of the particular LMB 406, updates data structures maintained by the OS for the respective pages of the LMB 406, and then selects another LMB 406 (e.g., moving from one LMB 406 to the next LMB 406 in affinity data table 420, where the above-described process may be repeated to update data structures of the pages of the selected LMB 406). After the OS-maintained data structures have been updated with the changed affinity information, VMM 402 may recompute various affinity statistics 440 related to the memory resources. For example, in some embodiments, VMM 402 may track, calculate and/or otherwise determine various affinity statistics corresponding to accessing various memory resources by certain applications/workloads. VMM 402 may be configured to re-set and/or re-compute the affinity statistics 440 based on the new/changed affinity data to more accurately reflect and/or report such statistical information (e.g., the statistics maintained by each CPU). In some embodiments, VMM 402 may also be configured to send a transmission and/or otherwise notify applications, device drivers and/or kernel extensions of the updated affinity information.

Figure 5:
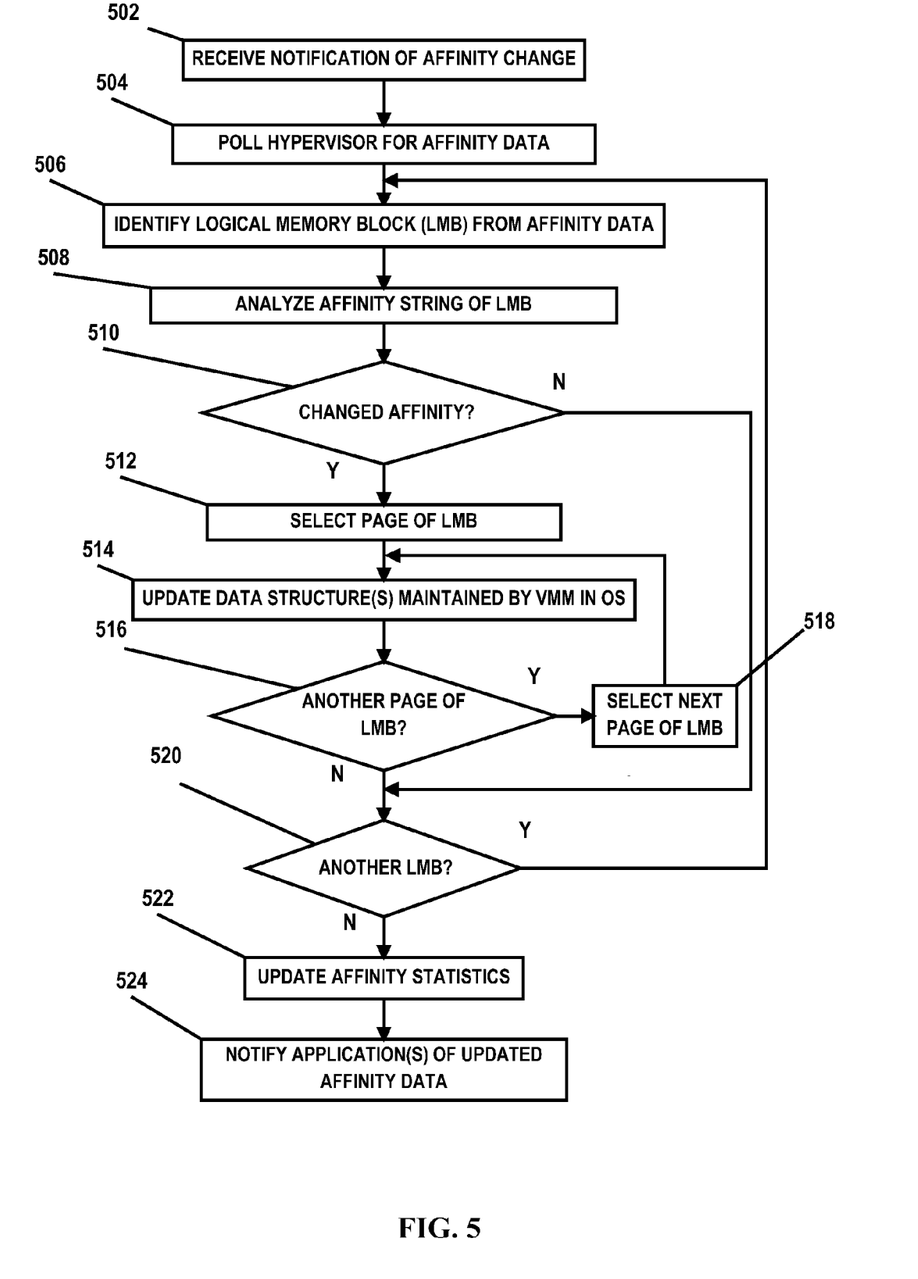
FIG. 5 is a flow diagram illustrating an embodiment of a method for refreshing memory topology in virtual machine operating systems according to the present disclosure.

FIG. 5 is a flow diagram illustrating an embodiment of a method for refreshing memory topology in virtual machine operating systems according to the present disclosure. The method begins at block 502, where an operating system (e.g., OS 322) receives a notification from hypervisor 338 that affinity information has been changed/updated. At block 504, VMM 402 polls hypervisor 338 for affinity data 410. Affinity data 410 may be presented in tabular and/or other form. In some embodiments, VMM 402 may be configured to format and/or otherwise create an affinity data table 420 based on the received affinity data 410. At block 506, VMM 402 selects a particular LMB 406 (e.g., selecting a first an entry from affinity data table 420). At block 508, VMM 402 analyzes the affinity string 408 of the selected LMB 406.

At decisional block 510, a determination is made whether the affinity string 408 reflects a change in affinity for the selected LMB 406. If not, the method proceeds to decisional block 520. If the analyzed affinity string 408 does reflect a change in affinity, the method proceeds to block 512, where VMM 402 selects a page of the LMB 406. At block 514, VMM 402 updates data structures maintained by the OS (e.g., individual page frame data structure 434 and/or other types of OS-maintained data structures) for the selected page with the updated affinity information. At decisional block 516, a determination is made whether there is another page of the selected LMB 406 needing updating. If so, the method proceeds to block 518, where VMM 402 selects another and/or the next page of the LMB 406, and the method proceeds to block 514. If at decisional block 516 it is determined that there are no further pages of the LMB 406 to update, the method proceeds to decisional block 520, where a determination is made whether there is another LMB 406 to analyze (e.g., another LMB 406 entry in affinity data table 420). If so, the method proceeds to block 506, where the next LMB 406 is selected. If at decisional block 520 it is determined that there are no further LMBs 406 to analyze/process, the method proceeds to block 522, where VMM 402 updates and/or re-computes affinity statistics based on the changes in affinity. At block 524, VMM 402 notifies application(s) (e.g., applications 330, 332, 334 and/or 336), device drivers and/or kernel extensions of the updated affinity information.

Thus, embodiments of the present disclosure enable memory topology and affinity to be refreshed in virtual machine operating systems without requiring a re-boot of the operating system. Further, embodiments of the present disclosure enable dynamic memory affinity updates to take place in the operating system based on affinity changes made to the physical resources of a computing system platform.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A system, comprising:
    a processor; and
    logic executable by the processor to:
        responsive to receiving, by an operating system of a virtual machine, a notification of an affinity change relative to workload memory resources, poll a hypervisor for updated memory affinity data, the affinity data comprising an affinity string indicating one of a plurality of affinity domains, each affinity domain indicating a collection of logical memory blocks having a particular affinity level to the processor;
        identify, by parsing the affinity data, for each logical memory block of the workload memory resources, the affinity string of the respective logical memory block;
        determine whether the affinity string for the respective logical memory block has changed;
        responsive to determining that the affinity string for the respective logical memory block has changed, identify a data structure of the logical memory block maintained by the operating system;
        determine if an affinity domain exists for the data structure based on the affinity string;
        responsive to determining that the affinity domain does not exist for the data structure, allocate the affinity domain for the affinity string; and
        update affinity information in the data structure based on the change to the affinity string of the logical memory block.

2. The system of claim 1, wherein the logic is executable to re-compute affinity statistics for a workload based on the updated affinity data.

3. The system of claim 1, wherein the logic is executable to:
    responsive to determining for each logical memory block whether the affinity string has changed for the respective logical memory blocks, determine whether there are any empty affinity domains; and
    responsive to discovering an empty affinity domain, delete the empty affinity domain.

4. The system of claim 1, wherein the logic is executable to transmit a message to at least one application notifying the application of the change in affinity.

5. A computer program product for refreshing memory topology in virtual machine operating systems, the computer program product comprising:
    a computer readable storage medium having computer readable program code embodied therewith, the computer readable program code comprising computer readable program code configured to:
        responsive to receiving, by an operating system of a virtual machine, a notification of an affinity change relative to workload memory resources, poll a hypervisor for updated memory affinity data, the affinity data comprising an affinity string indicating one of a plurality of affinity domains, each affinity domain indicating a collection of logical memory blocks having a particular affinity level to a processor;
        identify, by parsing the affinity data, for each logical memory block of the workload memory resources, the affinity string of the respective logical memory block;
        determine whether the affinity string for the respective logical memory block has changed;
        responsive to determining that the affinity string for the respective logical memory block has changed, identify a data structure of the logical memory block maintained by the operating system;
        determine if an affinity domain exists for the data structure based on the affinity string;
        responsive to determining that the affinity domain does not exist for the data structure, allocate the affinity domain for the affinity string; and
        update affinity information in the data structure based on the change to the affinity string of the logical memory block.

6. The computer program product of claim 5, wherein the computer readable program code is configured to re-compute affinity statistics for a workload based on the updated affinity data.

7. The computer program product of claim 5, wherein the computer readable program code is configured to:
    responsive to determining for each logical memory block whether the affinity string has changed for the respective logical memory blocks, determine whether there are any empty affinity domains; and
    responsive to discovering an empty affinity domain, delete the empty affinity domain.

8. The computer program product of claim 5, wherein the computer readable program code is configured to transmit a message to at least one application notifying the application of the change in affinity.

9. A system, comprising:
    a plurality of memory resources; and
    a plurality of virtual machines each having allocated thereto a virtualized portion of the memory resources, each virtual machine having an instance of an operating system, wherein at least one of the operating systems is operable to:
        poll a hypervisor for updated memory resource affinity data, the affinity data comprising an affinity string indicating one of a plurality of affinity domains, each affinity domain indicating a collection of logical memory blocks having a particular affinity level to a processor;
        identify, by parsing the affinity data, for a logical memory block of the memory resources, the affinity string of the respective logical memory block;
        determine whether the affinity string for the logical memory block has changed;
        responsive to determining that the affinity string for the logical memory block has changed, identify a data structure of the logical memory block maintained by the operating system;
        determine if an affinity domain exists for the data structure based on the affinity string;

responsive to determining that the affinity domain does not exist for the data structure, allocate the affinity domain for the affinity string; and update affinity information in the data structure based on the change to the affinity string of the logical memory block.

10. The system of claim 9, wherein the operating system is operable to re-compute affinity statistics for a workload based on the updated affinity data.

11. The system of claim 9, wherein the operating system is operable to:

responsive to determining that the affinity string has changed for the logical memory block, determine whether there are any empty affinity domains; and responsive to discovering an empty affinity domain, delete the empty affinity domain.

12. The system of claim 9, wherein the operating system is operable to transmit a message to at least one application notifying the application of the change in affinity.

* * * * *